(12) United States Patent
Maples et al.

(10) Patent No.: US 11,242,078 B2
(45) Date of Patent: Feb. 8, 2022

(54) UTILITY CART

(71) Applicants: Paige A. Maples, West Palm Beach, FL (US); Gerald L. Maples, West Palm Beach, FL (US)

(72) Inventors: Paige A. Maples, West Palm Beach, FL (US); Gerald L. Maples, West Palm Beach, FL (US)

(73) Assignees: Gerald L. Maples, West Palm Beach, FL (US); Paige A. Maples, West Palm Beach, FL (US)

( * ) Notice: Subject to any disclaimer, the term of this patent is extended or adjusted under 35 U.S.C. 154(b) by 80 days.

(21) Appl. No.: 15/930,212

(22) Filed: May 12, 2020

(65) Prior Publication Data
US 2021/0354741 A1   Nov. 18, 2021

(51) Int. Cl.
*B62B 3/02* (2006.01)
*F16B 12/10* (2006.01)

(52) U.S. Cl.
CPC .............. *B62B 3/022* (2013.01); *F16B 12/10* (2013.01); *B62B 2205/20* (2013.01); *B62B 2205/32* (2013.01)

(58) Field of Classification Search
CPC ....... B62B 3/022; B62B 3/02; B62B 2205/20; B62B 2205/32; B62B 2205/30; F16B 12/10
See application file for complete search history.

(56) References Cited

U.S. PATENT DOCUMENTS 5,873,204 A * 2/1999 Gehn ................... B62B 3/004
                                                  52/204.1
5,915,723 A    6/1999 Austin
6,349,962 B1   2/2002 Johanson
(Continued)

FOREIGN PATENT DOCUMENTS

EP       3109129 A1    12/2016
WO    2017037702 A1     3/2017

OTHER PUBLICATIONS

Origami Folding Kitchen Cart on Wheels | for Chefs Outdoor Coffee Wine and Food, Microwave Cart, Kitchen Island on Wheels, Rolling Cart, Kitchen Appliance & Utility Cart | Silver with Wood by Origami; see specifications at https://www.amazon.com/Origami-Foldable-Kitchen-Island-Silver/dp/B0082H30LY.
(Continued)

*Primary Examiner* — John D Walters
(74) *Attorney, Agent, or Firm* — K&L Gates, LLP

(57) ABSTRACT

A foldable cart comprising an upper frame, a lower frame, and a plurality of legs attached to and supporting the upper frame and the lower frame is disclosed. Each leg is configured to be folded into a folded configuration from an erect configuration. Each leg comprises a lock configured to hold the leg in the erect configuration. The lock comprises a lock bar movable between a locking position and an unlocking position, an internal support brace, wherein the lock bar extends through the internal support brace, and a spring configured to bias the lock bar into the locking position to hold the leg in the erect configuration. The lock bar is
(Continued)

spring-loaded against the internal support brace, wherein the entire length of the spring surrounds the lock bar, and wherein the spring is confined entirely within the internal support brace.

21 Claims, 20 Drawing Sheets

(56) References Cited

U.S. PATENT DOCUMENTS

| | | |
|---|---|---|
| 7,731,221 B2 | 6/2010 | Bess |
| 8,814,199 B2 | 8/2014 | Shindelar et al. |
| 8,998,246 B2 | 4/2015 | Griffard |
| 9,056,621 B1 | 6/2015 | Jin et al. |
| 9,145,154 B1 | 9/2015 | Horowitz |
| 9,220,338 B2 * | 12/2015 | Wen ................ A47B 31/04 |
| 9,975,565 B1 * | 5/2018 | Liao ................ B62B 3/02 |
| 10,106,182 B2 | 10/2018 | Camarco et al. |
| 10,207,729 B2 | 2/2019 | Sun |
| 10,232,867 B1 | 3/2019 | Jones et al. |
| 2016/0347341 A1 | 12/2016 | Tauber |
| 2018/0009461 A1 | 1/2018 | Rucker |
| 2020/0223462 A1 * | 7/2020 | Ferree, Jr. ............ B62B 1/002 |

OTHER PUBLICATIONS

Collapsible Utility Cart—Folding Cart—Heavy Duty by the Collapsible Cart; see specifications at https://www.amazon.com/Collapsible-Utility-Cart-Folding-Heavy/dp/B00UO50Y84.

* cited by examiner

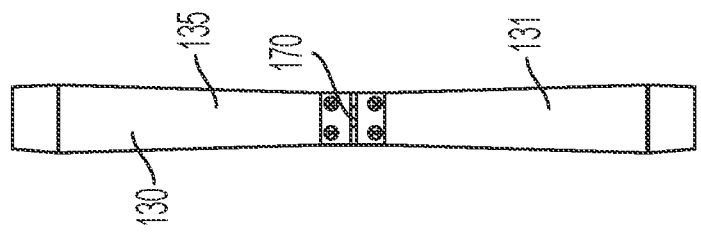
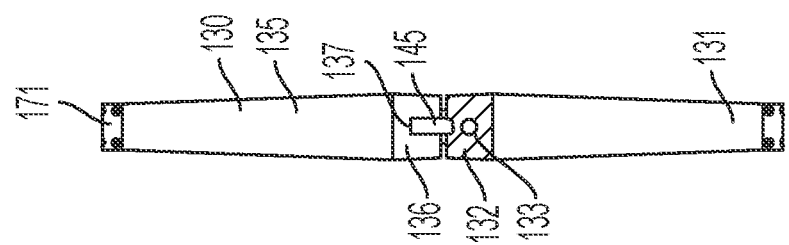
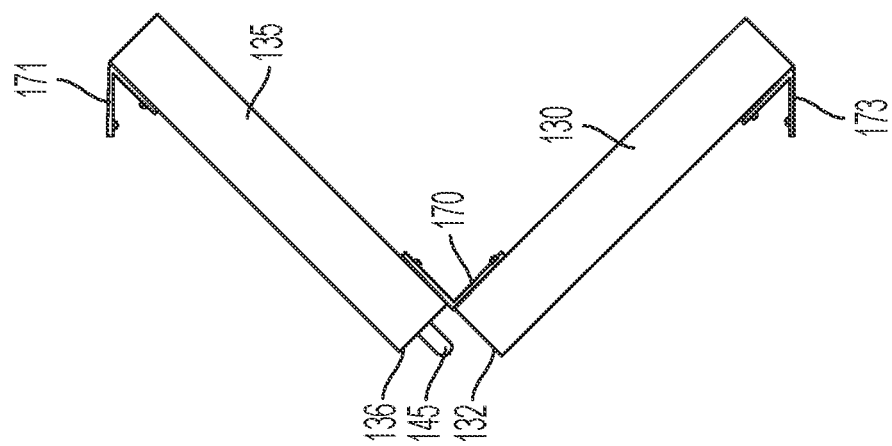

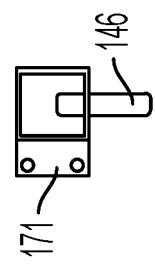
FIG. 15
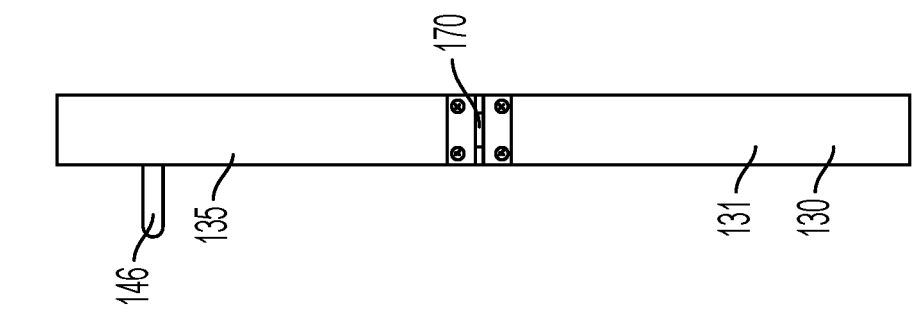
FIG. 14
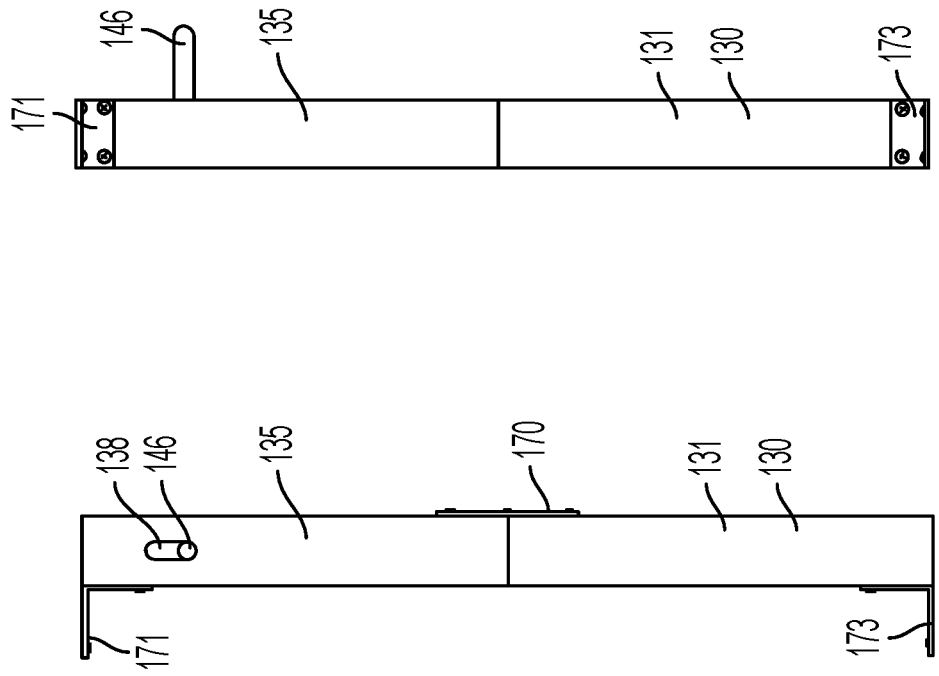
FIG. 13
FIG. 12

UTILITY CART

BACKGROUND

The present disclosure relates to carts and transporting objects therewith.

SUMMARY

A utility cart comprising a handle, an upper tray, and a lower tray is disclosed. The utility cart further comprises a plurality of collapsible legs attached to the upper tray and the lower tray, wherein each collapsible leg comprises an upper member pivotably connected to the upper tray, a lower member pivotably connected to the lower tray, wherein the upper member and the lower member are pivotably connected to each other such that the upper lower and the lower member can be folded relative to each other to collapse the leg, and a spring-loaded support mechanism configured to hold the upper member and the lower member in an erect configuration. The support mechanism comprises a lock bar extending through the upper member and the lower member to hold the upper member and the lower member in an erect configuration. The lock bar comprises a lever portion extending laterally out of the upper member, a support portion extending from the lever portion and into the lower member and a pin. The support mechanism further comprises an internal support bracket attached to the upper member, wherein the support portion of the lock bar is received through a first side of the internal support bracket and a second side of the internal support bracket, and wherein the pin is positioned between the first side and the second side of the internal support bracket. The support mechanism further comprises a spring, wherein an entirety of the spring surrounds the lock bar between the first side and the second side of the internal support bracket, wherein the pin is configured to compress the spring against the internal support bracket to move the lock bar into an actuated configuration to move the support portion out of locking engagement with the lower member so that the upper member and the lower member can be collapsed, and wherein the spring is confined entirely within the internal support bracket.

A collapsible cart comprising an upper frame, a lower frame, and a plurality of collapsible legs attached to and supporting the upper frame and the lower frame is disclosed. Each collapsible leg comprises an upper member pivotably connected to the upper frame, a lower member pivotably connected to the lower frame, wherein the upper member and the lower member are pivotably connected to each other such that the upper lower and the lower member can be folded relative to each other to collapse the leg, and a support mechanism configured to hold the upper member and the lower member in an erect configuration. The support mechanism comprises a locking pole extending through the upper member and the lower member to hold the upper member and the lower member in an erect configuration. The locking pole comprises a lever portion extending laterally out of the upper member, a locking portion extending from the lever portion and into the lower member, and a pin. The support mechanism further comprises an internal support brace attached to the upper member, wherein the support portion of the locking pole is received through a first side of the internal support brace and a second side of the internal support brace, and wherein the pin is positioned between and bound by the first side and the second side of the internal support brace. The support mechanism further comprises a spring configured to bias the locking pole into a locking position, wherein the entire length of the spring surrounds the locking portion between the first side and the second side of the internal support brace, wherein the locking pole is movable from the locking position into an unlocking position to compress the spring against the internal support brace with the pin and move the locking portion out of locking engagement with the lower member so that the upper member and the lower member can be collapsed, and wherein the spring is confined entirely within the internal support brace.

A foldable cart comprising an upper frame, a lower frame, and a plurality of legs attached to and supporting the upper frame and the lower frame is disclosed. Each leg is configured to be folded into a folded configuration from an erect configuration. Each leg comprises a first member pivotably attached to the upper frame, a second member pivotably attached to the lower frame, and a lock configured to hold the leg in the erect configuration. The lock comprises a lock bar extending through the first member and the second member, wherein the lock bar is movable between a locking position and an unlocking position, an internal support brace attached to the first member, wherein the lock bar extends through the internal support brace, and a spring configured to bias the lock bar into the locking position to hold the leg in the erect configuration, wherein the lock bar is spring-loaded against the internal support brace, wherein the entire length of the spring surrounds the lock bar between a first side of the internal support brace and a second side of the internal support brace, wherein the lock bar is movable into the unlocking position to compress the spring against the internal support brace and move the lock bar out of locking engagement with the second member so that the leg can be folded, and wherein the spring is confined entirely within the internal support brace.

FIGURES

The various aspects described herein, both as to organization and methods of operation, together with further objects and advantages thereof, may best be understood by reference to the following description, taken in conjunction with the accompanying drawings as follows.

FIG. 9 is an elevational view of the leg of FIG. 3, wherein the support mechanism is illustrated in the locked configuration and the upper member and the lower member are illustrated in a partially folded configuration;

FIG. 10 is an elevational view of the leg of FIG. 3, wherein the support mechanism is illustrated in the locked configuration and the upper member and the lower member are illustrated in a partially folded configuration;

FIG. 11 is an elevational view of the leg of FIG. 3, wherein the upper member and the lower member are illustrated in a partially folded configuration;

FIG. 12 is an elevational view of the leg of FIG. 3, wherein the support mechanism is illustrated in the locked configuration and the upper member and the lower member are illustrated in an erect configuration;

FIG. 13 is an elevational view of the leg of FIG. 3, wherein the support mechanism is illustrated in the locked configuration and the upper member and the lower member are illustrated in an erect configuration;

FIG. 14 is an elevational view of the leg of FIG. 3, wherein the support mechanism is illustrated in the locked configuration and the upper member and the lower member are illustrated in an erect configuration;

FIG. 15 is a plan view of the upper member of FIGS. 12-14;

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Before explaining various aspects of utility carts in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

Various aspects are directed to improved utility carts. Aspects of the utility carts can be configured for transporting objects, for example.

Figure 1:
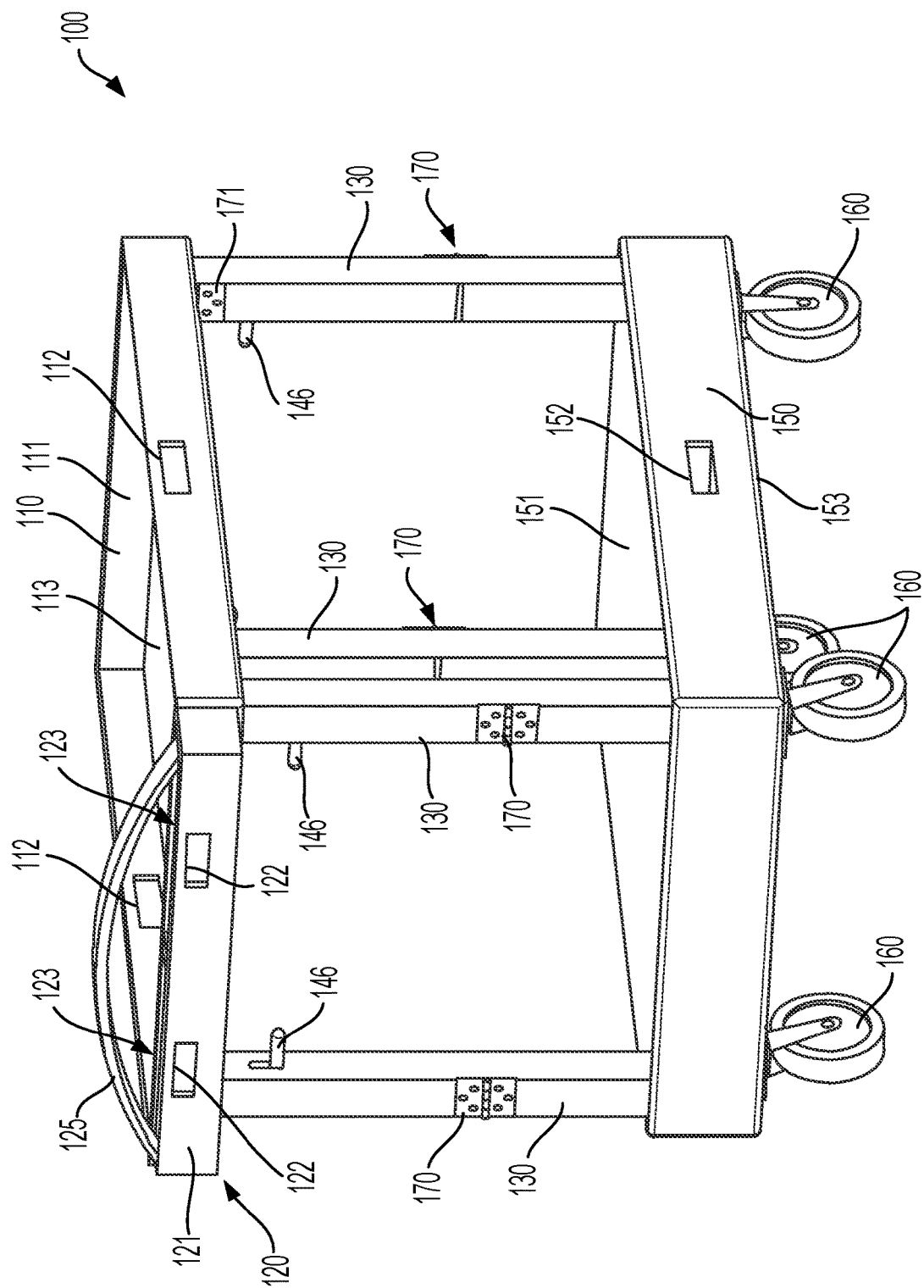
FIG. 1 is a perspective view of a cart comprising an upper tray, a lower tray, a plurality of collapsible legs, and a handle.
Figure 2:
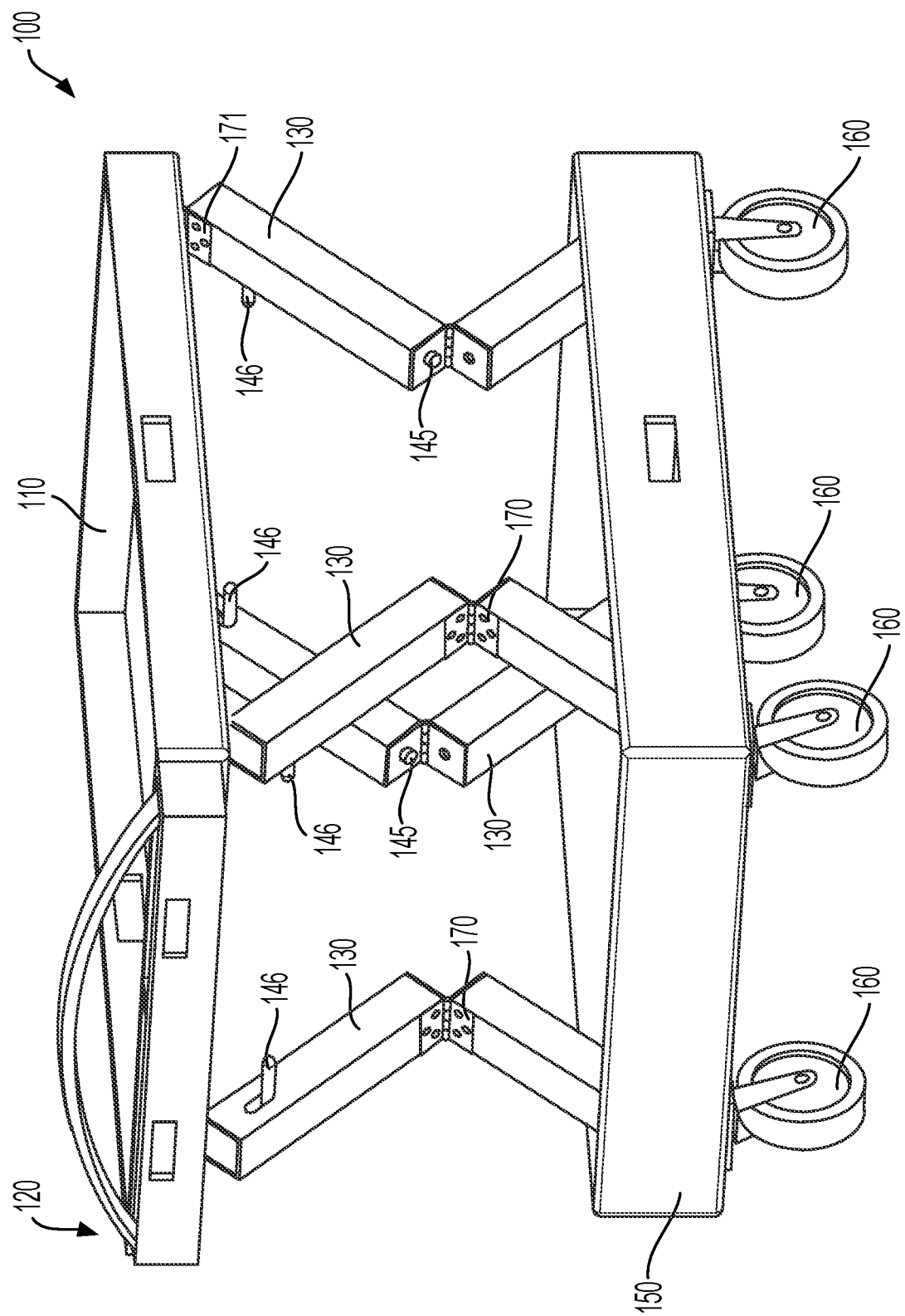
FIG. 2 is a perspective view of the cart of FIG. 1 shown in a partially collapsed configuration.

FIGS. 1-16 depict a utility cart 100 configured to transport objects. Referring primarily to FIGS. 1 and 2, the utility cart 100 comprises an upper tray 110, a lower tray 150, and a plurality of collapsible legs 130 supported between the upper tray 110 and the lower tray 150. Discussed in greater detail below, the plurality of collapsible legs 130 are pivotably attached to the upper tray 110 and the lower tray 150 and are movable between an erect configuration (FIG. 1) and a collapsed configuration to permit folding of the utility cart 100. Folding of the utility cart can be useful for transporting the utility cart in a vehicle and/or for storing the utility cart in a compact space, for example. The utility cart 100 further comprises a plurality of wheels 160 attached to the lower tray 150 to permit the utility cart 100 to roll across the surface of which the utility cart 100 is being pushed. The utility cart 100 further comprises a handle assembly 120 comprising a support portion 121 and a grip 125 attached to the support portion 121. The support portion 121 is attached to the upper tray 110. The handle assembly 120 permits the utility cart 100 to be easily grabbed by a user, for example, to be pushed and/or pulled during use.

The upper tray 110 (FIG. 16) comprises a base 113 and outer walls 111 extending therefrom. The upper tray 110 can be used for holding objects during use of the utility cart 100. The outer walls 111 comprise one or more handle slots 112 which can be useful for lifting the utility cart 100, for example. Discussed in greater detail below, the handle slots 112 can also be utilized while transitioning the utility cart 100 into its collapsed configuration.

The lower tray 150 comprises a base 153 to which the wheels 160 are attached and outer walls 151 extending therefrom. The lower tray 150 can also be used for holding objects during use of the utility cart 100. The outer walls 151 comprise one or more handle slots 152 which can also be useful for lifting the utility cart 100, for example. The lower tray 150 can also act as a compartment for the collapsible legs 130 when the utility cart 100 is folded into its fully collapsed configuration, discussed in greater detail below. In at least one instance, the wheels 160 are attached directly below the attachment points of the legs 130 to increase the overall strength and/or weight capacity, for example.

The handle assembly 120 extends from a side of the upper tray 110. In at least one instance, more than one handle assembly 120 is attached to the utility cart 100. In such an instance, each wall 111 may contain a handle assembly 120 attached thereto. The support portion 121 comprises handle slots 122 and compartments 123 defined in the support portion 121. The handle slots 120 may aid in lifting the utility cart 100 and/or aid in collapsible the utility cart 100 into its collapsed configuration. The grip 125 can be used for pushing and/or pulling the cart from place to place. The grip 125 comprises an arcuate shape; however, other shapes are contemplated. In at least one instance, the grip 125 is removable and re-attachable to the support portion 121. In at least one instance, the utility cart 100 comprises a plurality of modular grip components. In at least one instance, the modular grip components can be swapped out for a desired configuration. For example, a grip may be easily movable to an opposite support portion on an opposite side of the cart where an objected already positioned in the upper tray may inhibit the ability to use the grip in its current position.

As can be seen in FIG. 2, the legs 130 are illustrated in a partially collapsed, or folded, configuration. To allow for such folding, the legs comprise a lower member 131 and an upper member 135. The mechanism for providing the collapsibility of the legs 130 will be discussed in greater detail below. The legs 130 comprise a plurality of hinges pivotably connecting the legs 130 to the upper tray 110 and the lower tray 150. More specifically, each leg 130 comprises a first hinge 170 pivotably connecting the lower member 131 and the upper member 135. The hinges 170 face outward toward a short side of the utility cart 100; however, the hinges may be placed to face any suitable direction. Each leg also comprises an upper hinge 171 and a lower hinge 173 (FIGS. 6, 7, 9, 10, 12, and 13). The upper hinge 171 pivotably connects the upper member 135 to the base 113 of the upper tray 110 and the lower hinge 173 pivotably connects the lower member 131 to the base 153. While butt hinges are illustrated, any suitable hinge may be used. For example, flush hinges, pivot hinges, barrel hinges, and/or spring loaded hinges may be used. Moreover, any suitable combination of the hinges listed can be used.

Figure 3:
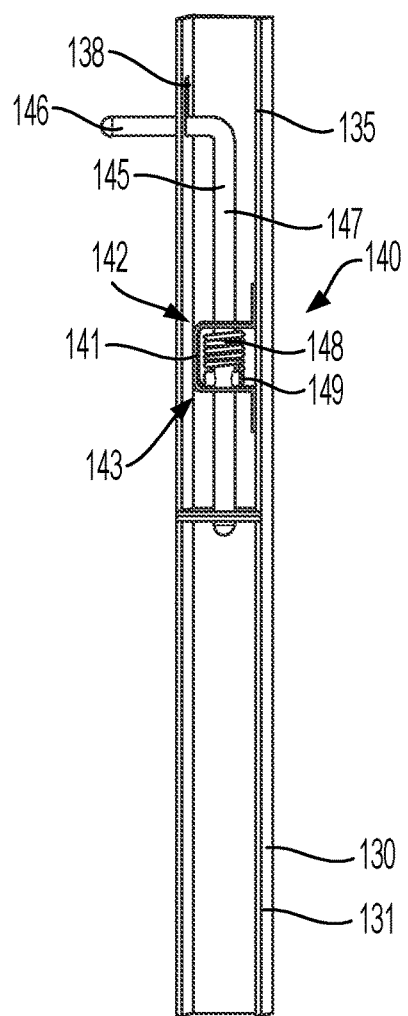
FIG. 3 is a partial perspective view of a leg of the plurality of legs of FIG. 1, wherein the leg comprises an upper member, a lower member, and a support mechanism movable between an locked configuration and an actuated configuration, wherein the support member is illustrated in the locked configuration.
Figure 4:
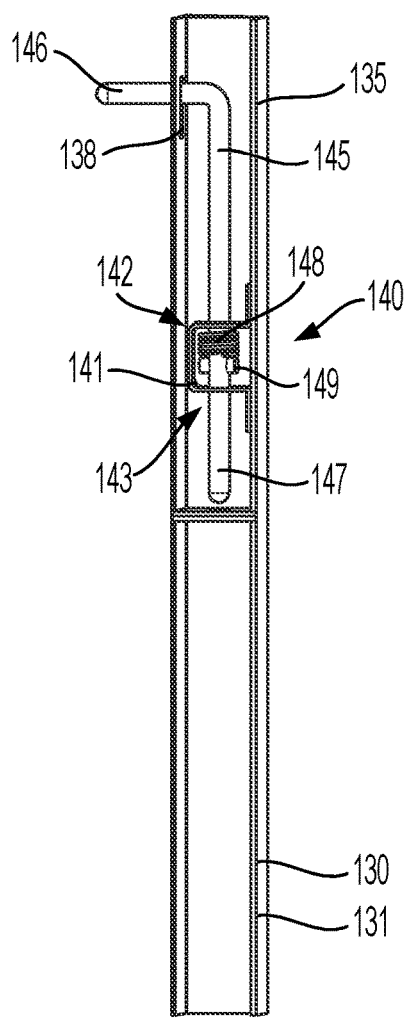
FIG. 4 is a partial perspective view the leg of FIG. 3, wherein the support mechanism is illustrated in the actuated configuration.
Figure 5:
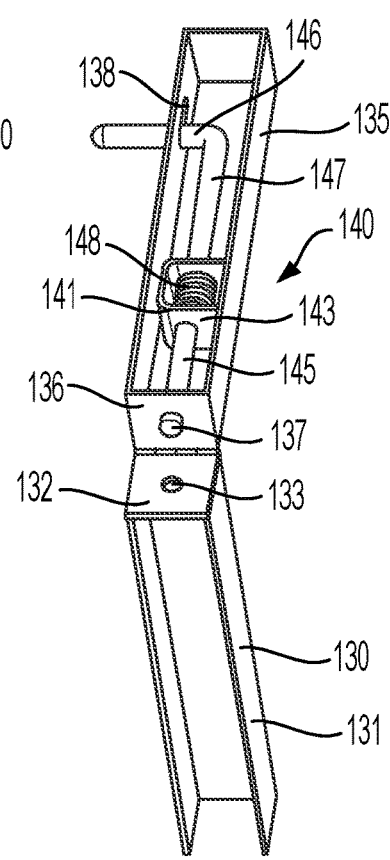
FIG. 5 is a partial perspective view of the leg of FIG. 3, wherein the upper member and the lower member are illustrated in a partially folded configuration and the support mechanism is illustrated in the locked configuration.
Figure 8:
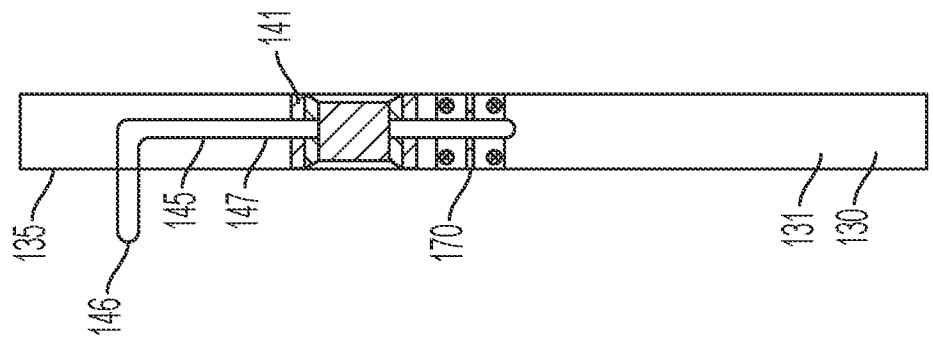
FIG. 8 is an elevational view of the leg of FIG. 3, wherein the support mechanism is illustrated in the locked configuration and the upper member and the lower member are illustrated in an erect configuration.
Figure 7:
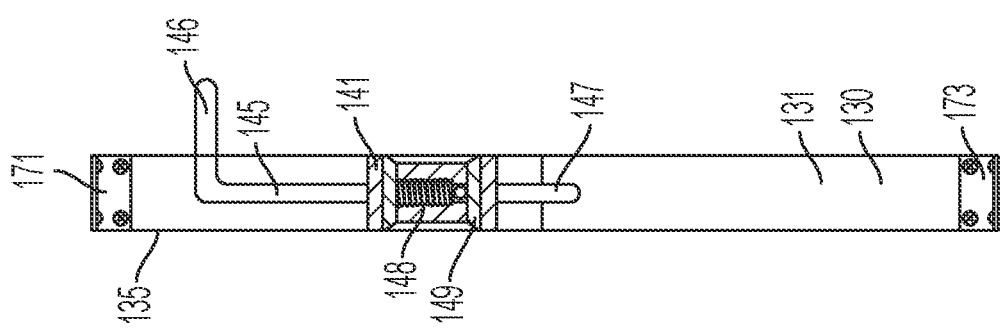
FIG. 7 is an elevational view of the leg of FIG. 3, wherein the support mechanism is illustrated in the locked configuration and the upper member and the lower member are illustrated in an erect configuration.
Figure 6:
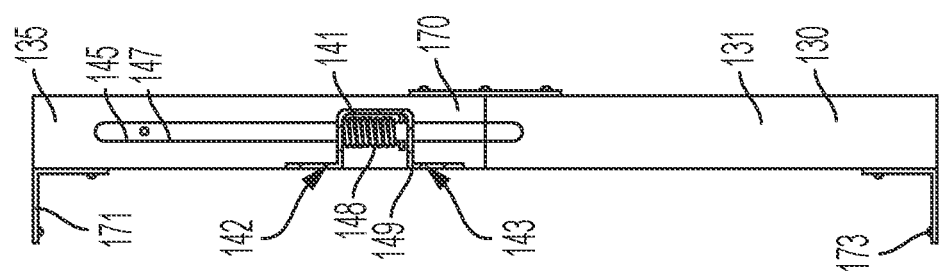
FIG. 6 is an elevational view of the leg of FIG. 3, wherein the support mechanism is illustrated in the locked configuration and the upper member and the lower member are illustrated in an erect configuration.
Figure 16:
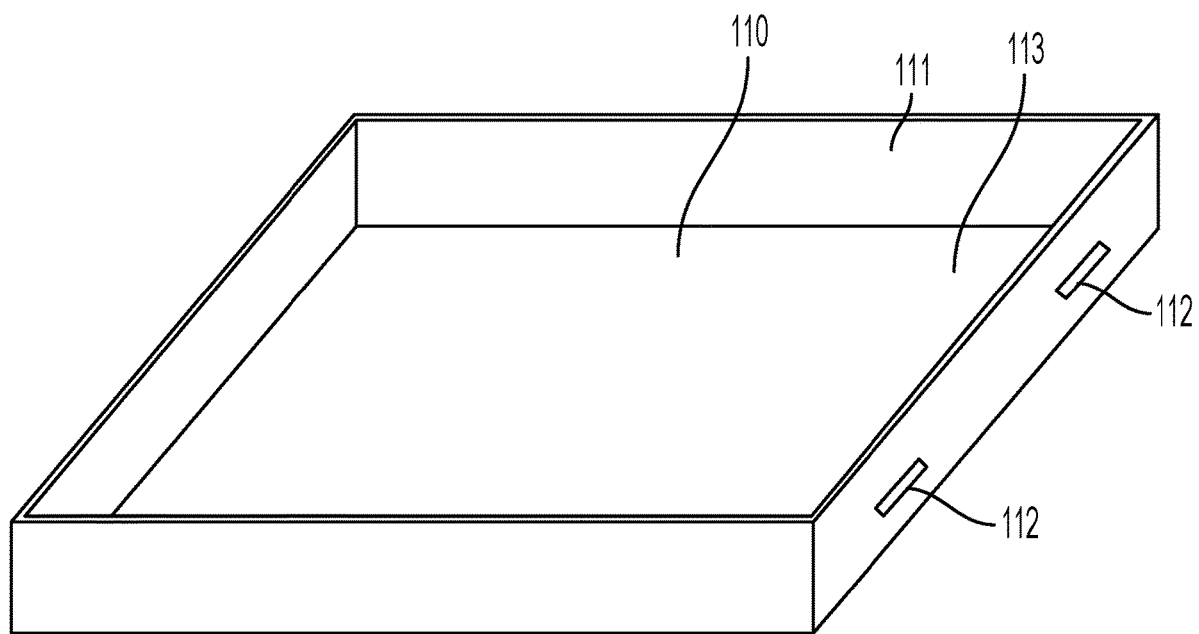
FIG. 16 is a perspective view of the upper tray of FIG. 1.
Figure 17:
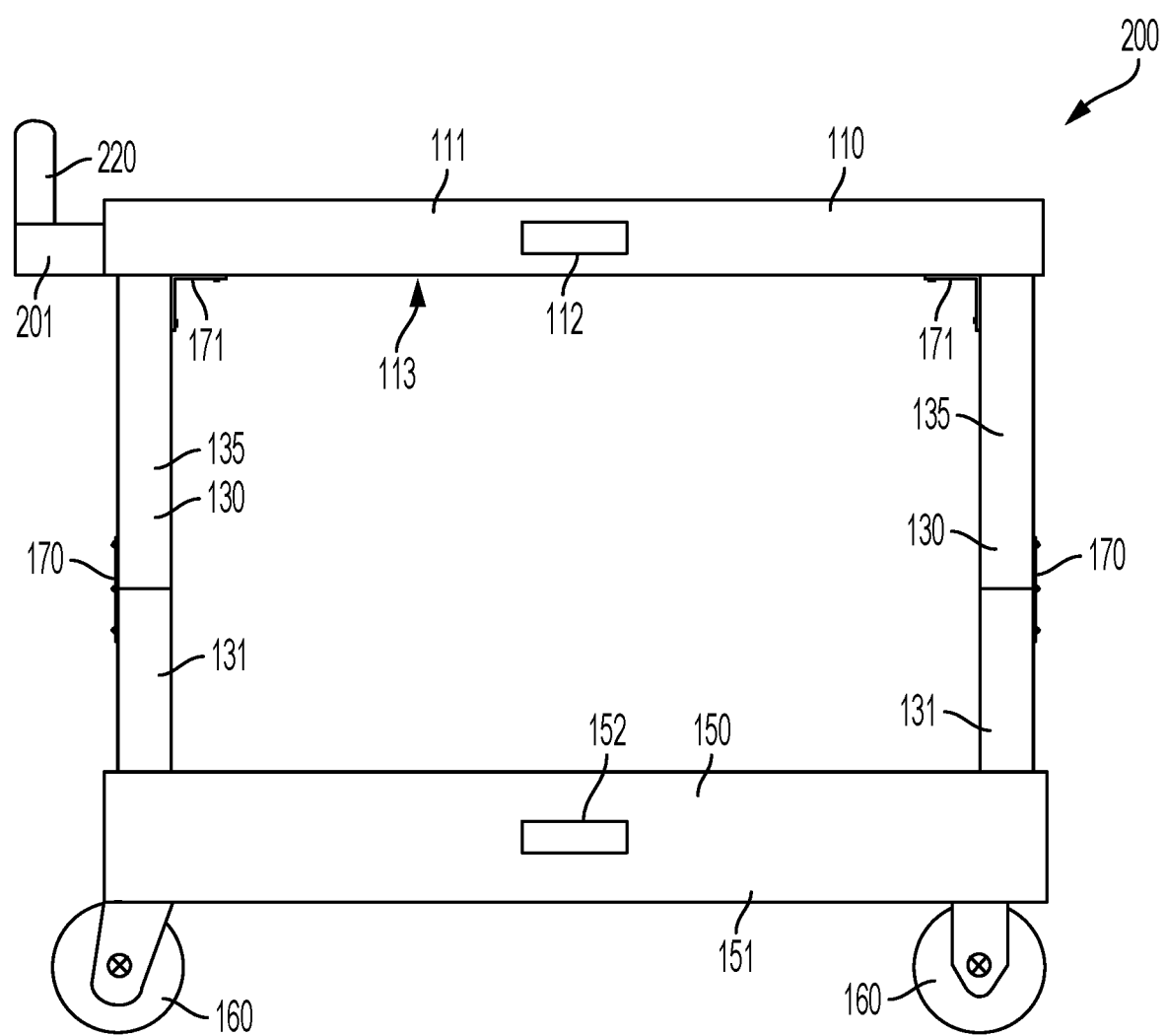
FIG. 17 is an elevation view of a cart comprising the upper tray, lower tray, and plurality of collapsible legs of FIG. 1 and a handle assembly.

Turning now primarily to FIGS. 3-11, each leg 130 comprises a support mechanism 140 configured to hold the lower member 131 and the upper member 135 in an erect configuration (FIGS. 3, 4). The support mechanism 140 is also configured to be actuated to release, or unlock, the lower member 131 and the upper member 135 to allow the leg 130 to be folded. The support mechanism 140 is illustrated as being primarily positioned within the upper member 135; however, the support mechanism 140 can comprise any suitable position such as, for example, primarily in the lower member 131.

The support mechanism 140 comprises an internal support brace, or bracket, 141, a lock bar 145, and a spring 148. The internal support brace 141 is fixedly attached to one or more inner walls of the upper member 135 and comprises a u-shaped profile. The internal support brace 141 comprises an upper ledge, or first side, 142 and a lower ledge, or second side, 143. Each ledge 142, 143 defines an aperture therethrough through which the lock bar 145 is received. The lock bar 145 comprises an L-shape. Any suitable shape may be used. The lock bar 145 comprises a lever portion 146 extending laterally out of an elongate slot 138 defined in the upper member 135 and a support portion 147 extending from the lever portion 146 through the upper member 135 and into the lower member 131 when the leg 130 is in its erect configuration.

The support portion 147 extends through the internal support brace 141. Specifically, the support portion 147 extends through the apertures defined in the ledges 142, 143. Between the ledges 142, 143, the entire length of the spring 148 surrounds the support portion 147 and is bound by the upper ledge 142 and a pin 149 of the lock bar 145. The pin 149 may be threaded into the support portion 141, for example. In at least one instance, the pin 149 is unitary with the support portion 147. The spring 148 biases the pin 149 and, thus, the lock bar 145 toward the lower member 131. When the leg 130 is in the erect configuration, the support portion 147 extends out of an aperture 137 (FIG. 10) defined in a bottom plate 136 of the upper member 135 and into an aperture 133 defined in an upper plate 132 of the lower member 131. In this position, the support portion 147 holds, or locks, the upper member 131 and the lower member 135 together and, thus, the leg 130 in its erect configuration. In this position, the lower member 131 and the upper member 135 are unable to be folded about the hinge 170. In at least one instance, the support portion 147 is press fit into aperture 133 defined in the upper plate 132. In at least one instance, the end of the support portion 147 extending into the lower member 131 comprises a rounded profile to allow the support portion 147 to be inserted into and removed from the aperture 133 more easily during folding and unfolding of the legs 130.

To unlock the legs 130 and allow the legs 130 to be folded, the lever portion 146 can be pulled in an upward direction to remove, or disengage, the support portion 147 from the aperture 133. When the lever portion 146 of the lock bar 145 is pulled in the upward direction, the pin 149 compresses the spring 148 (FIG. 4) against the upper ledge 142. This provides the ability to release the lever portion 146 and allow the lock bar 145 to spring back into its locked position (FIG. 3).

In at least one instance, the lower plate 132 and the upper plate 136 comprise a secondary holding means. The secondary holding means comprises hook and loop fastener fabric, for example. In such an instance, one of the lower plate 132 and the upper plate 136 comprises a hook fabric and the other of the lower plate 132 and the upper plate 136 comprises a loop fabric. Such a secondary holding means can provide additional holding force to hold the lower member 131 and the upper member 132 in their erect configuration.

In at least one instance, the lever portion 146 does not need to be actuated to move the lock bar 145 into its unlocked position when trying to unfold the legs 130 into their erect configurations. In this instance, no additional step is required when trying to erect the utility cart 100. For example, the upper tray 110 may be lifted by the handle slots 112 to erect the legs 130. When the upper member 131 and the lower member 135 are almost in their erect configuration, the support portion 141 of the lock bar may contact the upper plate 132 of the lower member 131. Further unfolding will cause the support portion 141 to be pushed upward by the upper plate 132 causing the spring 148 to, once again, compress. Once the support portion 141 is in alignment with the aperture 133, the support portion 141 will spring back into the aperture thereby locking the leg 130 into its erect configuration. Such a configuration can permit quick and easy unfolding of the utility cart 100 and eliminate any extra steps required to unfold the utility cart 100.

In another instance, the lever portion 146 requires actuation to move the lock bar 145 into its unlocked position to in order to place the legs 130 into their erect configurations. In this instance, an additional step is required when trying to erect the utility cart 100 to its fully erect configuration. For example, the upper tray 110 may be lifted by the handle slots 112 to erect the legs 130. When the upper member 131 and the lower member 135 are almost in their erect configuration, the support portion 141 of the lock bar may interfere with a side of the lower member 131. For example, the support portion 141 can be configured such that there is not enough clearance to contact the upper plate 132 and, as such, the support portion 141 must be actuated to provide the clearance to initiate the locking process and allow the legs 130 to achieve their fully erect configuration. Once the lock bar 145 is actuated into its unlocked position, further unfolding will cause the support portion 141 to clear the side of the lower member 131. Once the support portion 141 is in alignment with the aperture 133, the support portion 141 will spring back into the aperture thereby locking the leg 130 into its erect configuration once the lever portion 146 is released. Such a configuration may increase the stability of the locking engagement because, in such an instance, a longer and, therefore, possibly stronger lock bar can be used.

In at least one instance, a combination of the above configurations can be employed. For example, one of the plurality of legs 130 may utilize the arrangement that requires moving the lock bar 145 to its unlocked position in order to assure positive unfolding of the utility cart 100 while the other of the plurality of legs 130 may utilize the hands free locking arrangement. Such an arrangement can provide assurance to a user that the utility cart 100 is, in fact, entirely erect and locked in that position because the leg 130 that requires actuation to erect the utility cart 100 can provide feedback regarding the locking state of the leg 130 and, thus, the cart.

As can be seen in FIGS. 3-8, the spring 148 and pin 149 are entirely confined within the internal support brace 141. In other words, the support portion 147 of the lock bar 145 extends through the length of the spring 148 and at no point can the lock bar 145 become disengaged from the spring 148 owing to the confinement of the spring 148 and pin 149 within the internal support brace 141. Such a configuration can prevent accidental malfunction in a device where an entirety of a spring is not surrounding a lock bar, for example. Such a device risks operational disassembly. For example, if only a portion of the spring surrounds a lock bar through the actuation stroke of the lock bar, the spring may slip out of position rendering the mechanism useless. The support mechanism 140 provides an arrangement eliminating the possibility of operational disassembly. The spring 148 cannot slip out of position owing to being bound by the ledges 142, 143 and the lock bar 145 itself.

The spring 148 comprises a coil spring and, more specifically, a compression spring. While a coil spring is illustrated, any suitable spring may be used. For example, a leaf spring may be used in addition to, or in lieu of, a coil spring. In at least one instance, each lever portion 146 corresponding to each leg 130 is configured to be moved simultaneously to allow the legs 130 to be folded, or collapsed. In at least one instance, each lever portion 146 corresponding to each leg 130 may be actuated sequentially and do not have to be simultaneously actuated to fold the legs 130.

In at least one instance, the hinges 170, 171, and 173 (FIGS. 12-15) comprise maximum range of motion limits. For example, referring to FIGS. 12-14, each hinge may not be able to bend beyond a 90 degree range of motion. This may provide more stability and strength to the utility cart 100. This may also ensure proper unfolding and folding of the legs 130 so as to not over extend the legs 130 during folding and unfolding of the utility cart 100.

Figure 18:
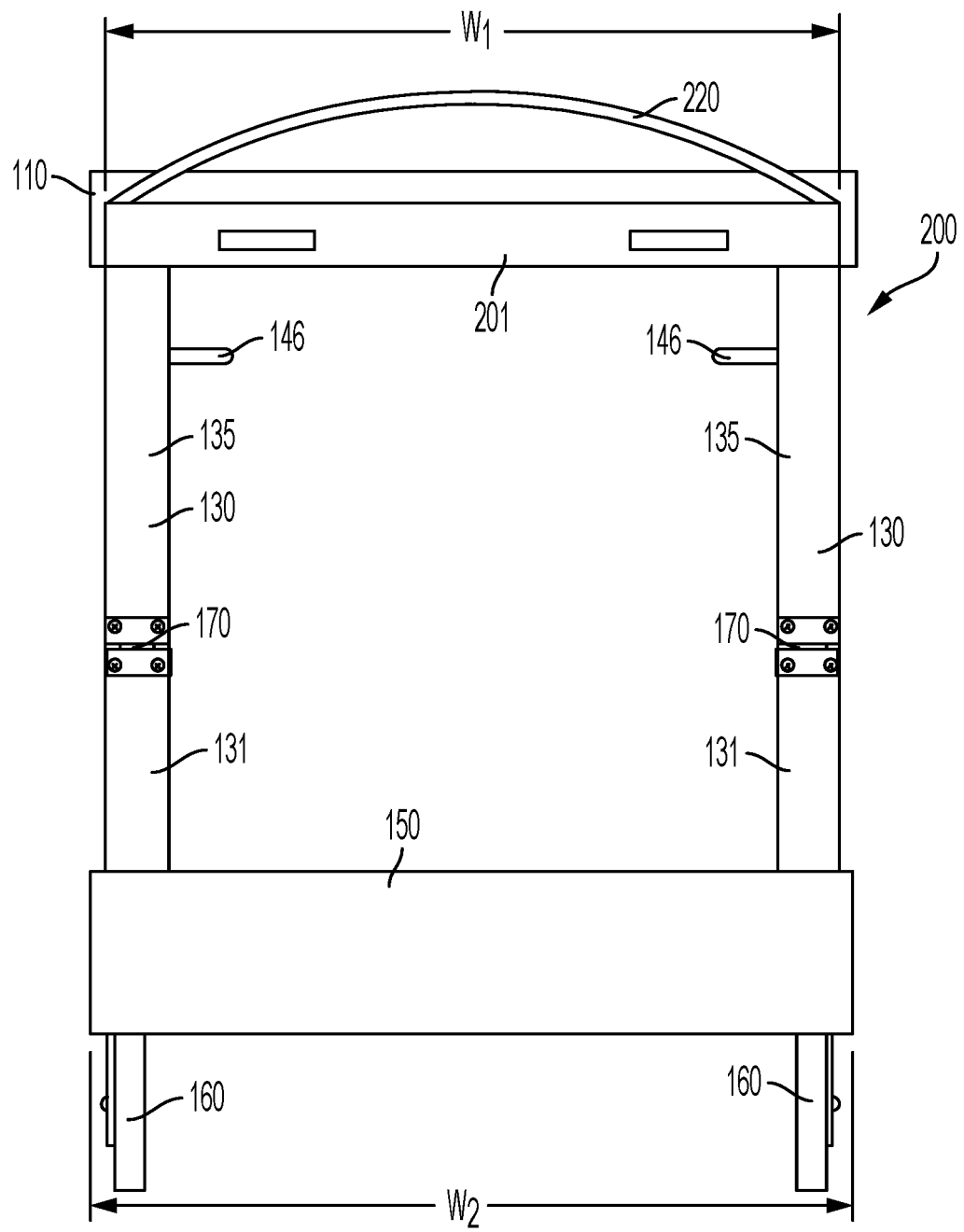
FIG. 18 is a front view of the cart of FIG. 17, wherein the collapsible legs are illustrated in an erect configuration.
Figure 19:
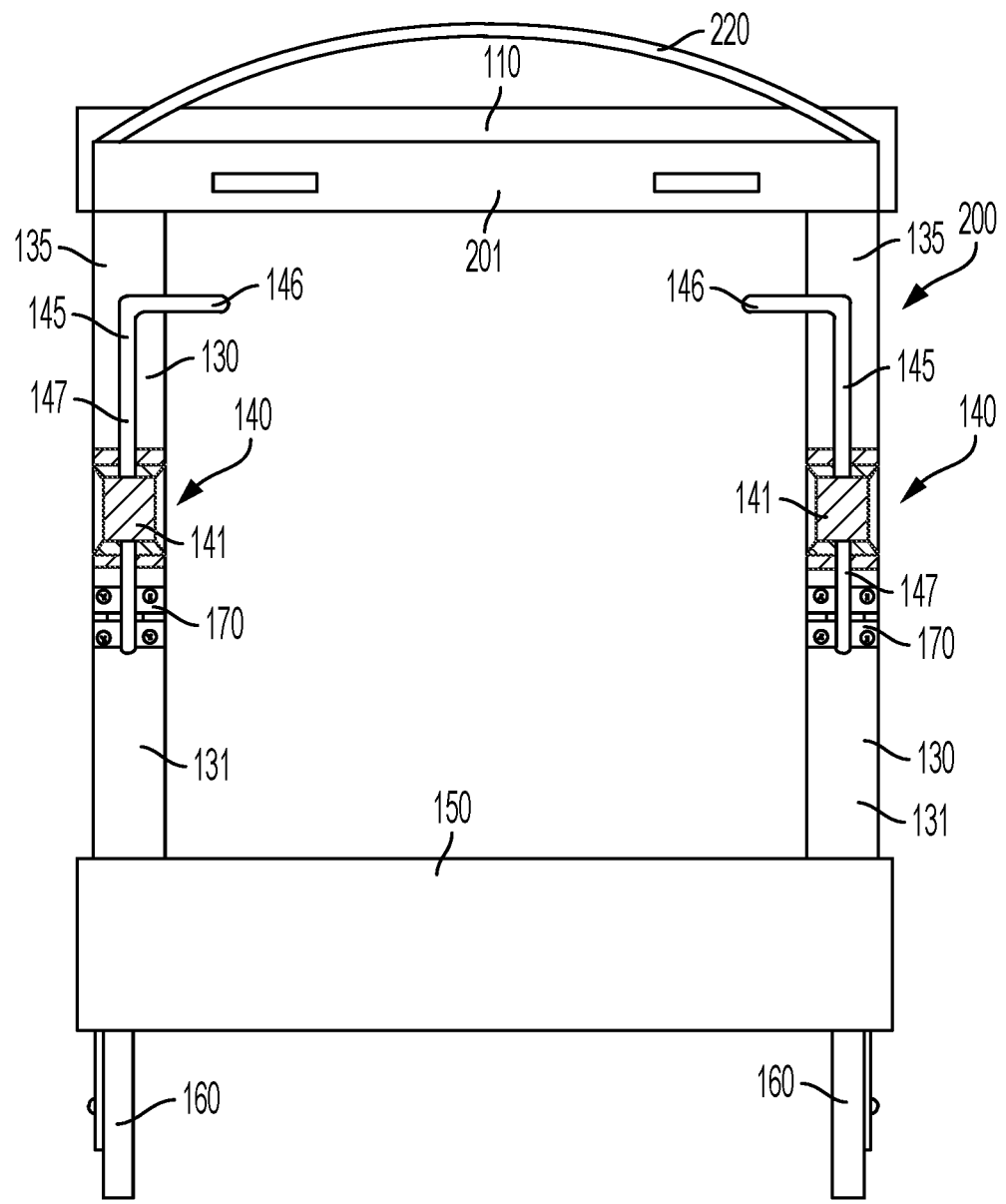
FIG. 19 is a partial front view of the cart of FIG. 17, wherein the collapsible legs are illustrated in an erect configuration.
Figure 20:
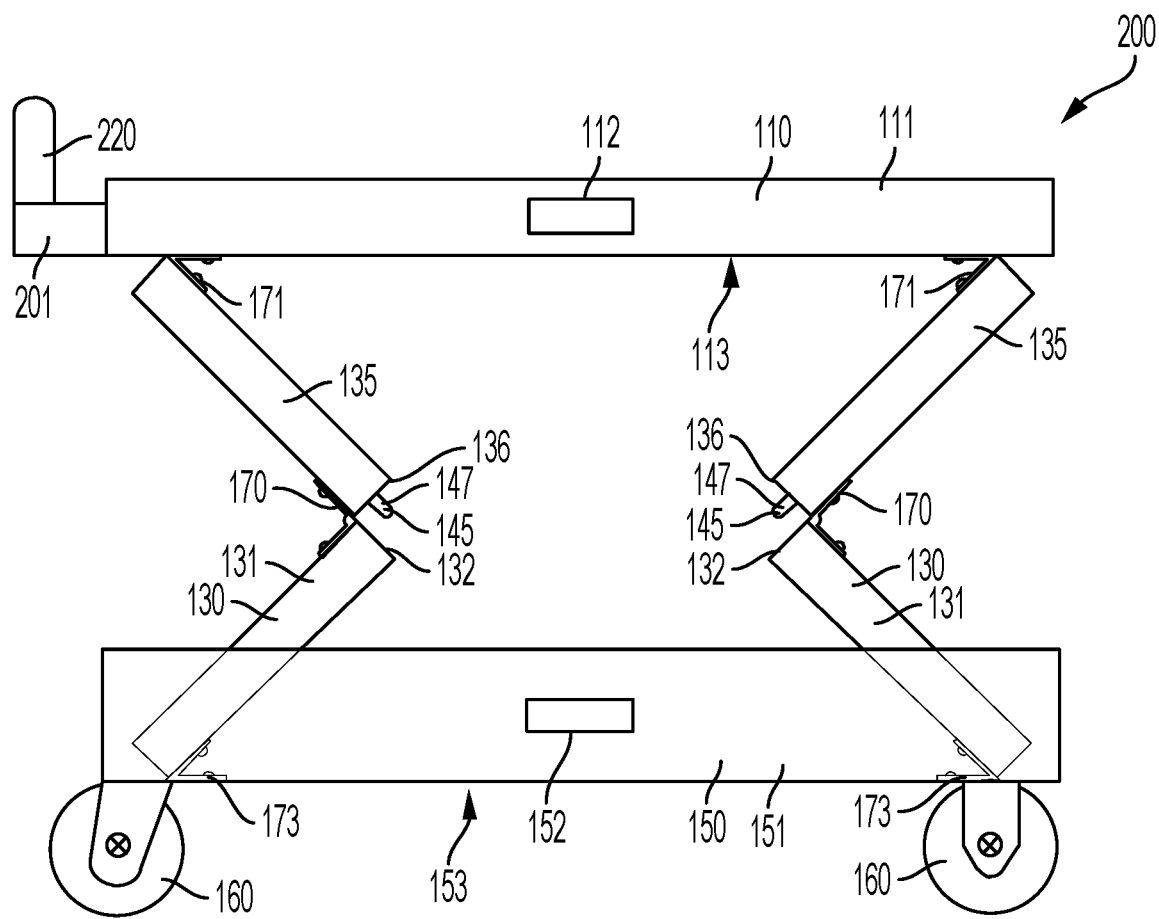
FIG. 20 is a partially transparent, elevational view of the cart of FIG. 17, wherein the collapsible legs are illustrated in a partially folded configuration.
Figure 21:
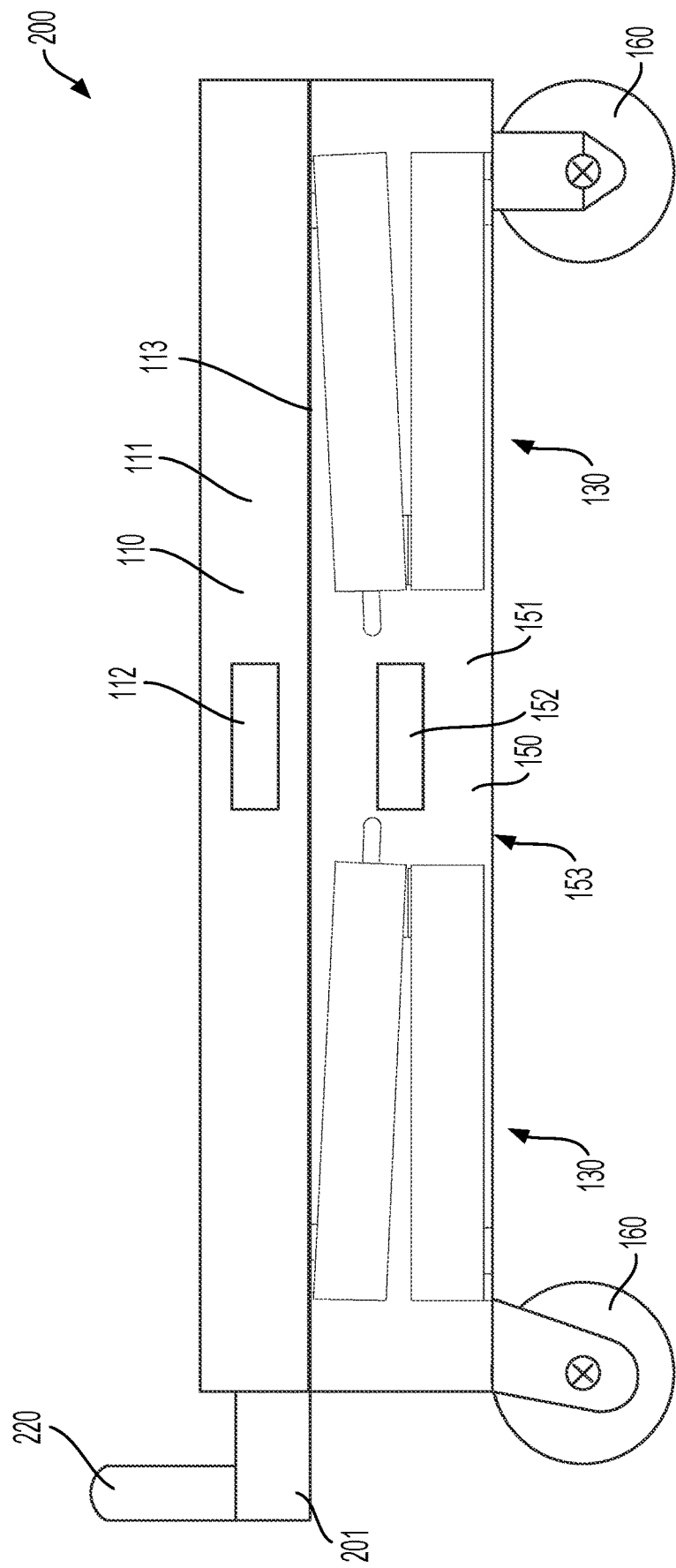
FIG. 21 is a partially transparent, elevational view of the cart of FIG. 17, wherein the collapsible legs are illustrated in a fully collapsed configuration.
Figure 23:
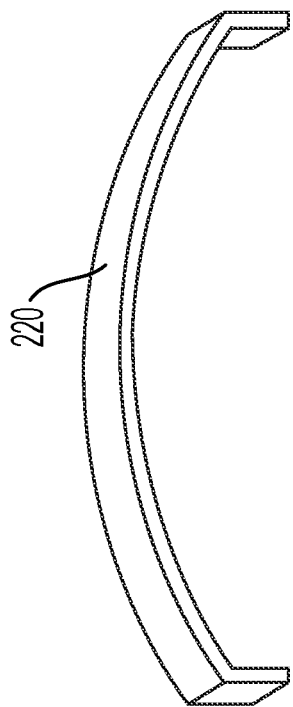
FIG. 23 is a perspective view of the grip of FIG. 22.
Figure 25:
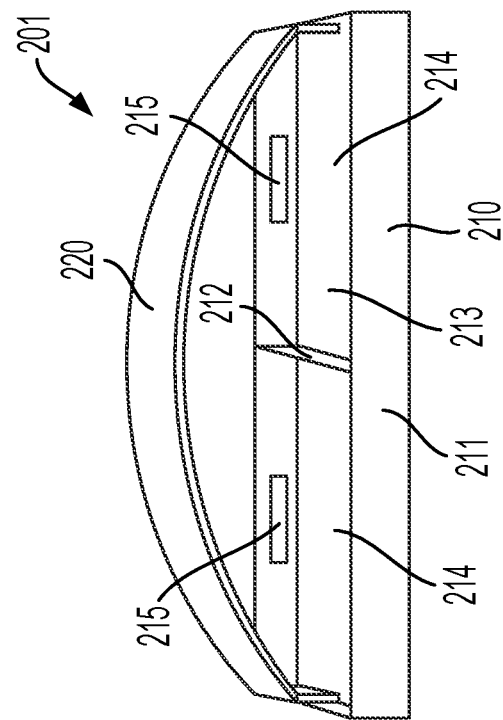
FIG. 25 is a perspective view of the handle assembly of FIG. 22.
Figure 22:
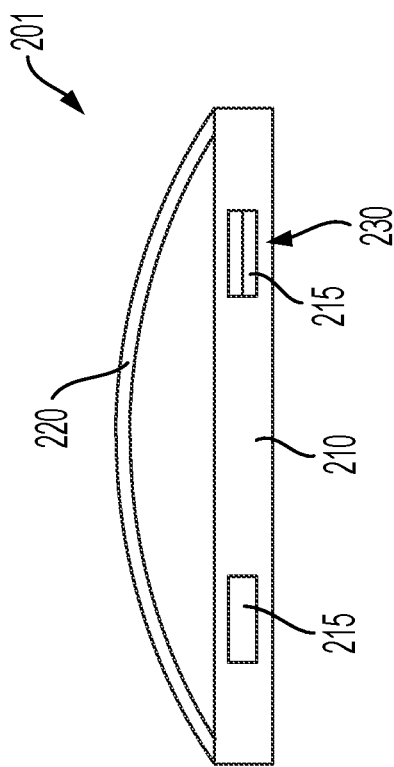
FIG. 22 is a front view of the handle assembly of FIG. 17, wherein the handle assembly comprises a support portion and a grip attached to the support portion.
Figure 24:
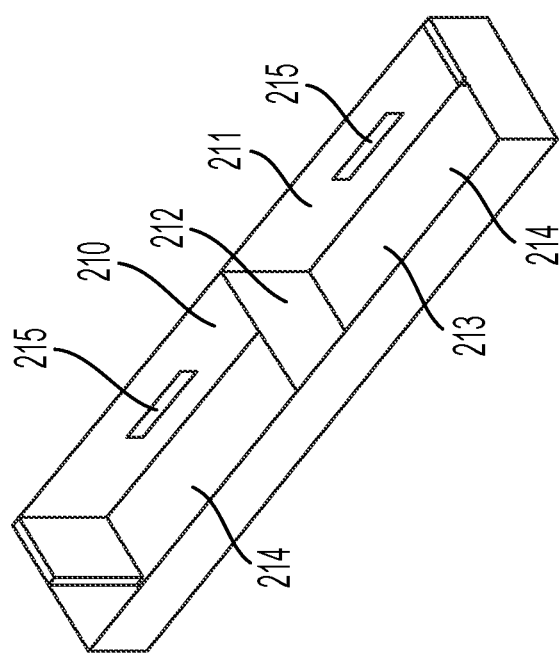
FIG. 24 is a perspective view of the support portion of FIG. 22.

FIGS. 17-25 depict a mobile, collapsible cart, or table, 200 comprising many of the same elements of the cart 100 except for the differences noted below. The cart 200 comprises a handle assembly 201 extends from a side of the upper tray 110. The collapsibility of the cart 200 can be seen more clearly in FIGS. 20 and 21. As can be seen in FIGS. 20 and 21, the lower members 131 of the legs 130 are attached to the base 153 by way of hinges 173 such that the legs 130 fold inward toward each other. In at least one instance, the legs 130 are hingedly attached to the upper tray 110 and the lower tray 130 in a manner where the legs 130 fold inward toward each other along the short side of the cart 200. FIG. 20 illustrates the cart 200 in a partially folded configuration. In at least one instance, the hinges 173 comprise spring hinges and, to ease folding of the legs 130 so that the upper tray 110 does not abruptly fall toward the lower tray 150, the spring hinges provide a cushion and support the cart 200 in the position illustrated in FIG. 20. At such point, a user may press downwardly on the upper tray 110 to overcome the spring force of the spring hinges. In such an instance, locking detents and/or tabs, for example, may be used to hold the upper tray 110 to the lower tray 150 and, thus, hold the cart in the fully collapsed configuration (FIG. 21). When a user is ready to unfold the cart 200, spring loaded push buttons can be used to unlock the cart 100 from its fully collapsed position at which point the spring hinges will bias the cart 200 back into the partially folded configuration (FIG. 20). A user can then pull the cart 200 into its erect configuration from this position. In at least one instance, the spring hinges bias the cart entirely into the erect configuration and no manual intervention is required by the user.

The handle assembly 201 comprises a support portion 210 extending from the upper tray 110 and a removable grip 220. Referring primarily to FIGS. 22-25, the support portion 210 comprises outer walls 211 defining handle slots 215 therein and a base 213 from which the outer walls 211 extend. The support portion 210 further comprises a divider 212 defining two compartments 214. More or less compartments are contemplated. The removable grip 220 comprises an arcuate, or arch-like, shape and can be removably attached to and from the support portion 210. The removable grip 220 may be removably attached to and from the support portion 210 by way of hook and loop fastener and/or tabs, for example. The tabs may comprise of the same or different material as the removable grip 220. The handle slots 215 may aid in lifting the utility cart 200 and/or aid in collapsible the utility cart 200 into its collapsed configuration. The grip 220 can be used for pushing and/or pulling the cart from place to place. In at least one instance, the grip 220 is attachable to and detachable from the support portion 210. In at least one instance, the utility cart 200 comprises a plurality of modular grip components similar to the cart 100 discussed above.

As can be seen in FIGS. 18 and 19, the support portion 210 of the handle assembly 201 comprises a width that is smaller than the width of the upper tray 110 and the lower tray 150. Such a configuration may increase the compactness of the cart 200 when the cart 200 is in its erect configuration and in its fully folded configuration.

In one or more of the handle slots 215, one or more levers, or actuators, 230 may be provided to actuate the lock bars 145 of the support mechanisms 140. Such a lever 230 can be used to enable simultaneous locking and/or unlocking of the lock bars 145. For example, cables are used to move the lock bars 145 between their unlocked positions and locked positions. In at least one instance, hydraulic cables and pistons are utilized. The lever 230 is configured to actuate the cables and, in at least one instance, pistons, to move the lock bars 145 between their unlocked positions and locked positions to collapse the cart 200.

Figure 26:
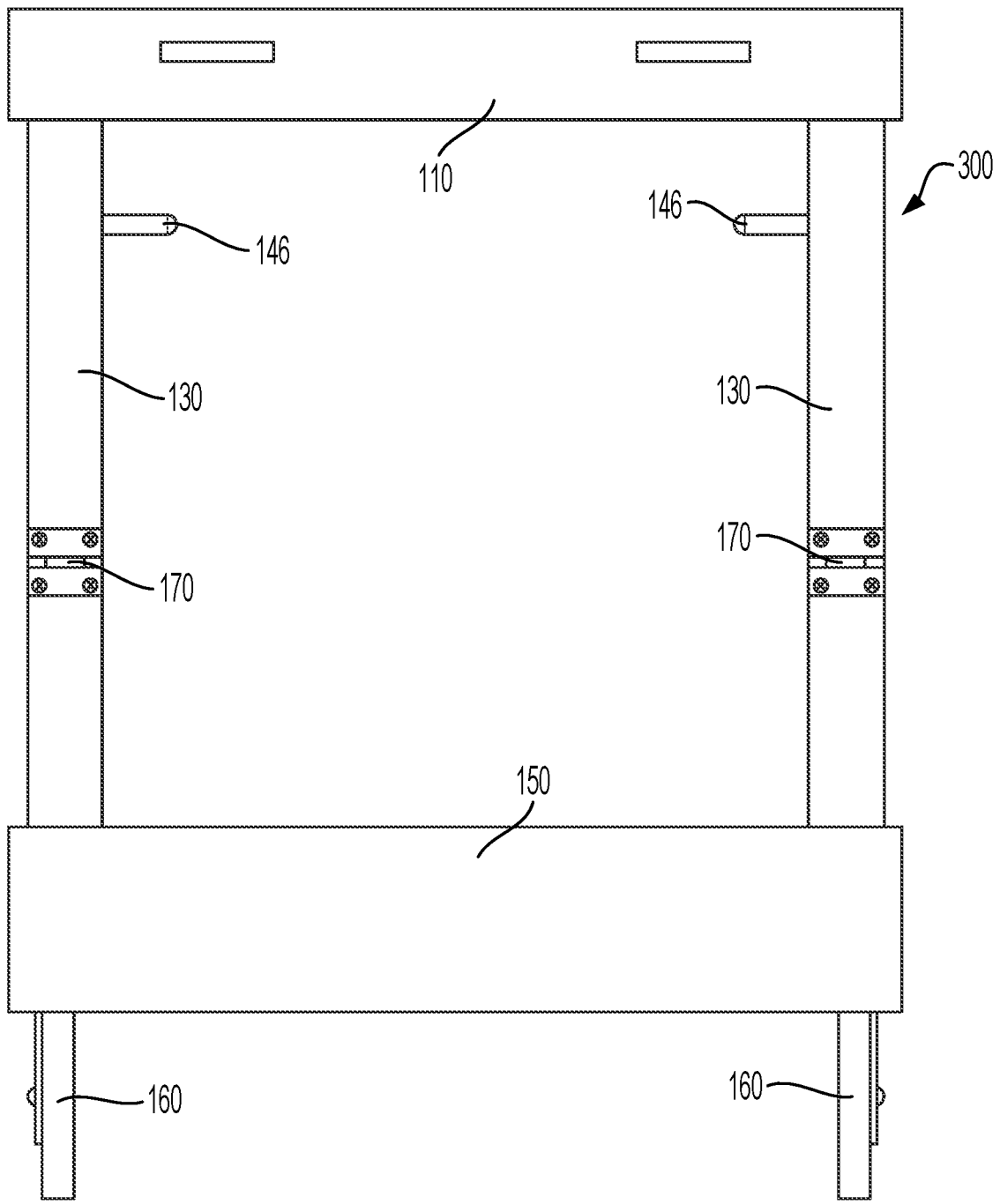
FIG. 26 is a front view of a cart without a handle assembly.

FIG. 26 depicts a collapsible cart 300 comprising many of the same elements as the cart 100 discussed above. However, the cart 300 does not comprise a handle assembly. In at least one instance, the handle assembly can be modular and, thus, the cart 300 can be used with and without the entire handle assembly. Hooks may be used to attach and detach a handle assembly to the handle slots 112 on the short side of the cart 300. This may allow for quick connect and disconnect of the entire handle assembly as well as any other desired modular components.

Figure 27:
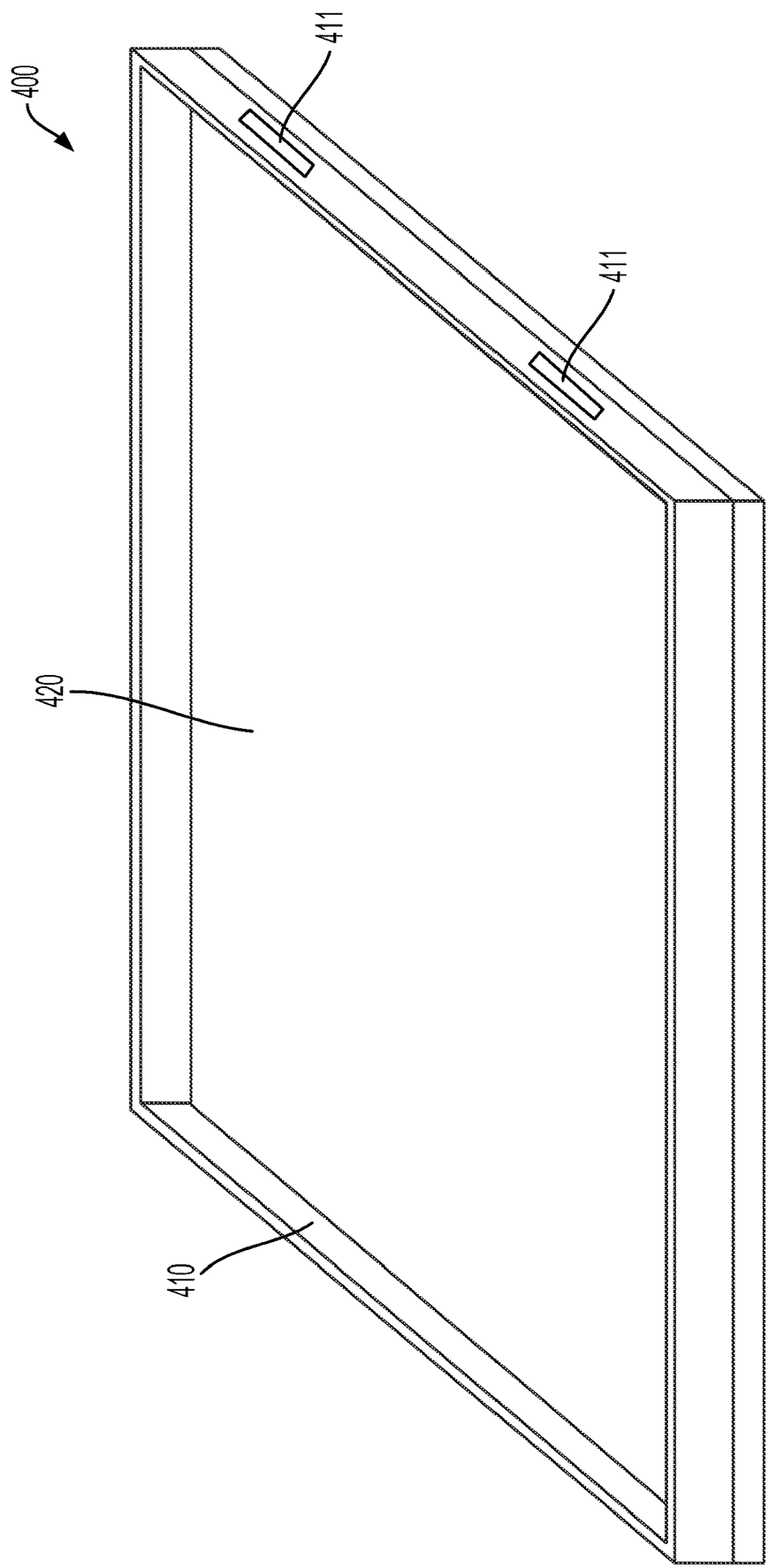
FIG. 27 is a perspective view of an upper tray for use with a cart assembly.
Figure 28:
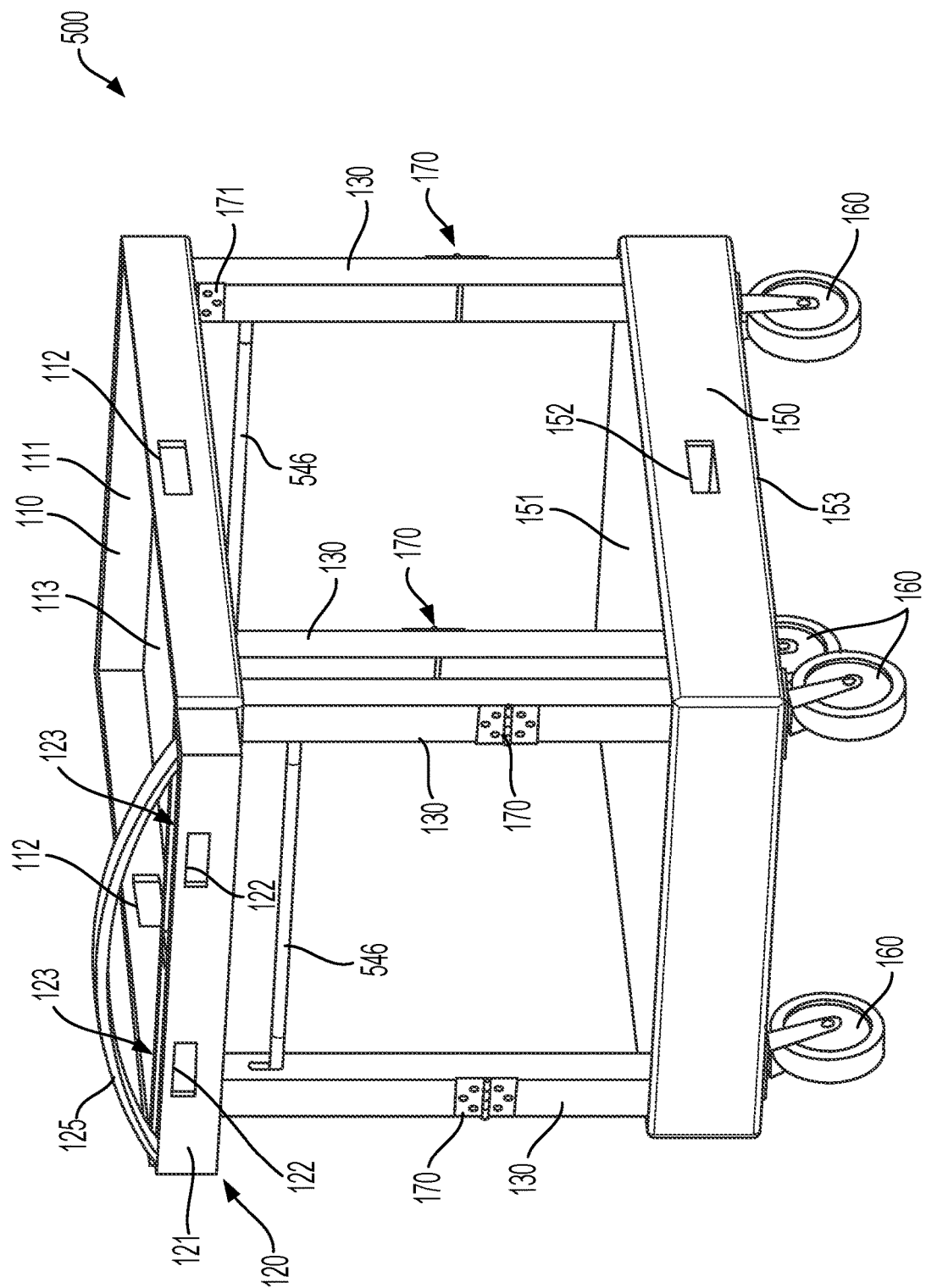
FIG. 28 is a perspective view of a cart comprising a cross member lever.
Figure 29:
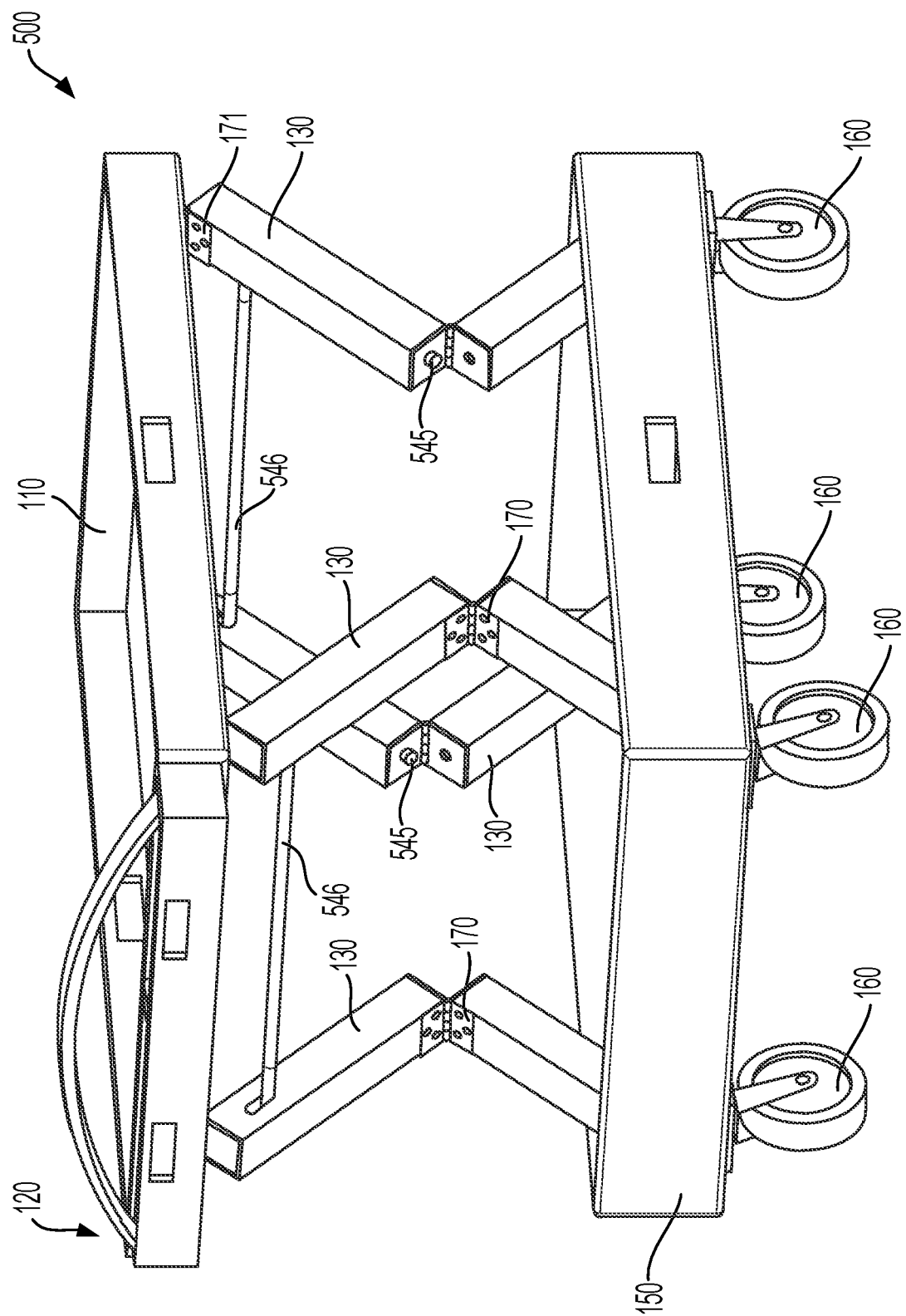
FIG. 29 is a perspective view of the cart of FIG. 28 shown in a partially collapsed configuration.
Figure 30:
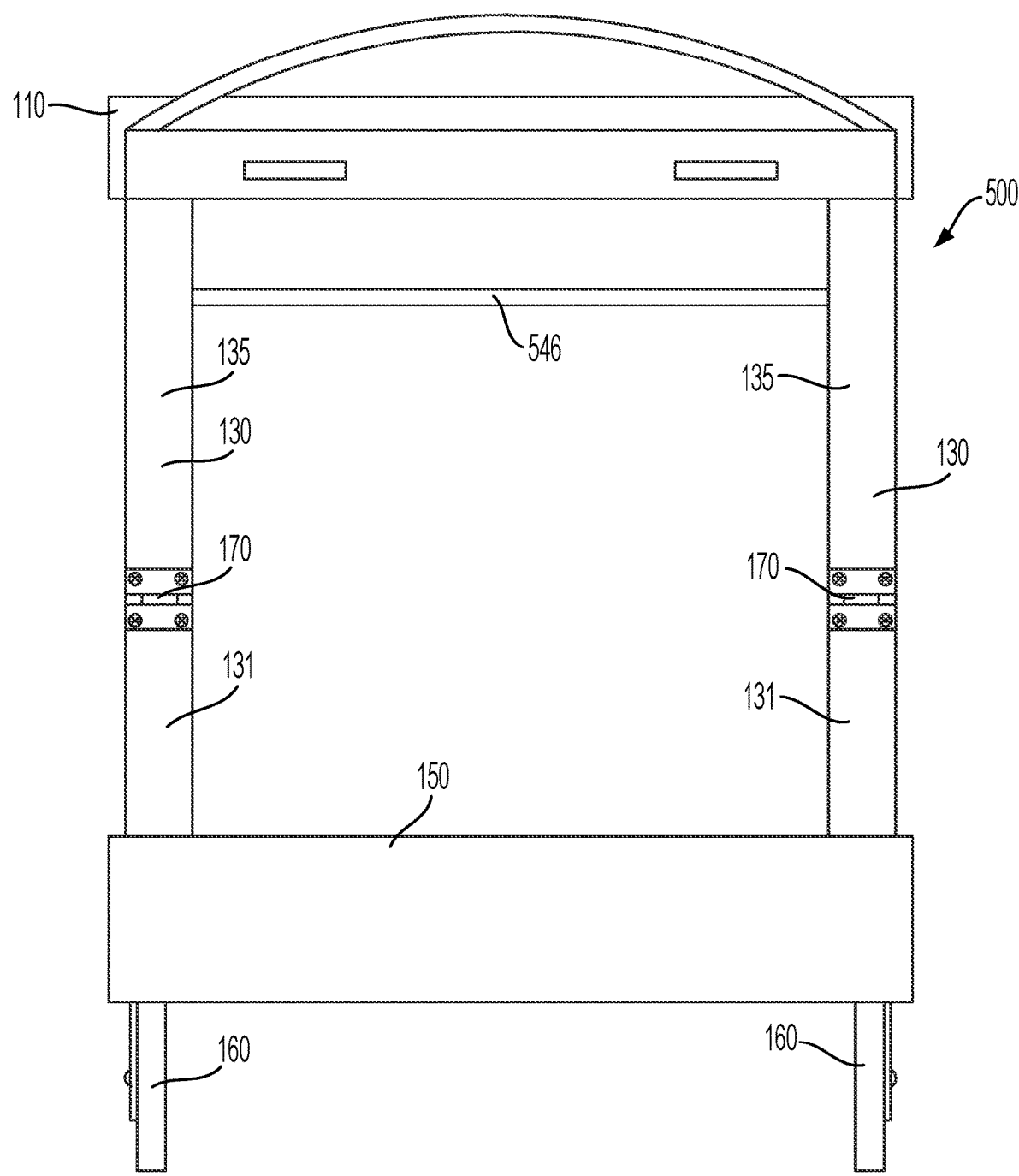
FIG. 30 is a front view of the cart of FIG. 28, wherein the collapsible legs are illustrated in an erect configuration.

FIG. 27 depicts an upper tray 400 in accordance with at least one embodiment. The upper tray 400 may also be used as a lower tray in a cart in accordance with at least one embodiment. The upper tray 400 comprises a base 420 and outer walls 410 extending from the base 420. The outer walls 410 comprise one or more handle slots 411 defined therein. The base 420 comprises a thickness and the outer walls 410 comprise a height. The thickness of the base may be relatively thick compared to the outer walls 410. In at least one instance, the thickness of the base 420 and the height of the outer walls 410 comprise a thickness ratio of about 1:2. Other thickness ratios are contemplated. Having a thicker base 410 can provide a more stable and/or robust frame for lifting and compressing the cart utilizing the upper tray 400 where compression forces may be high to provide greater holding forces within the legs of the cart.

Figure 31:
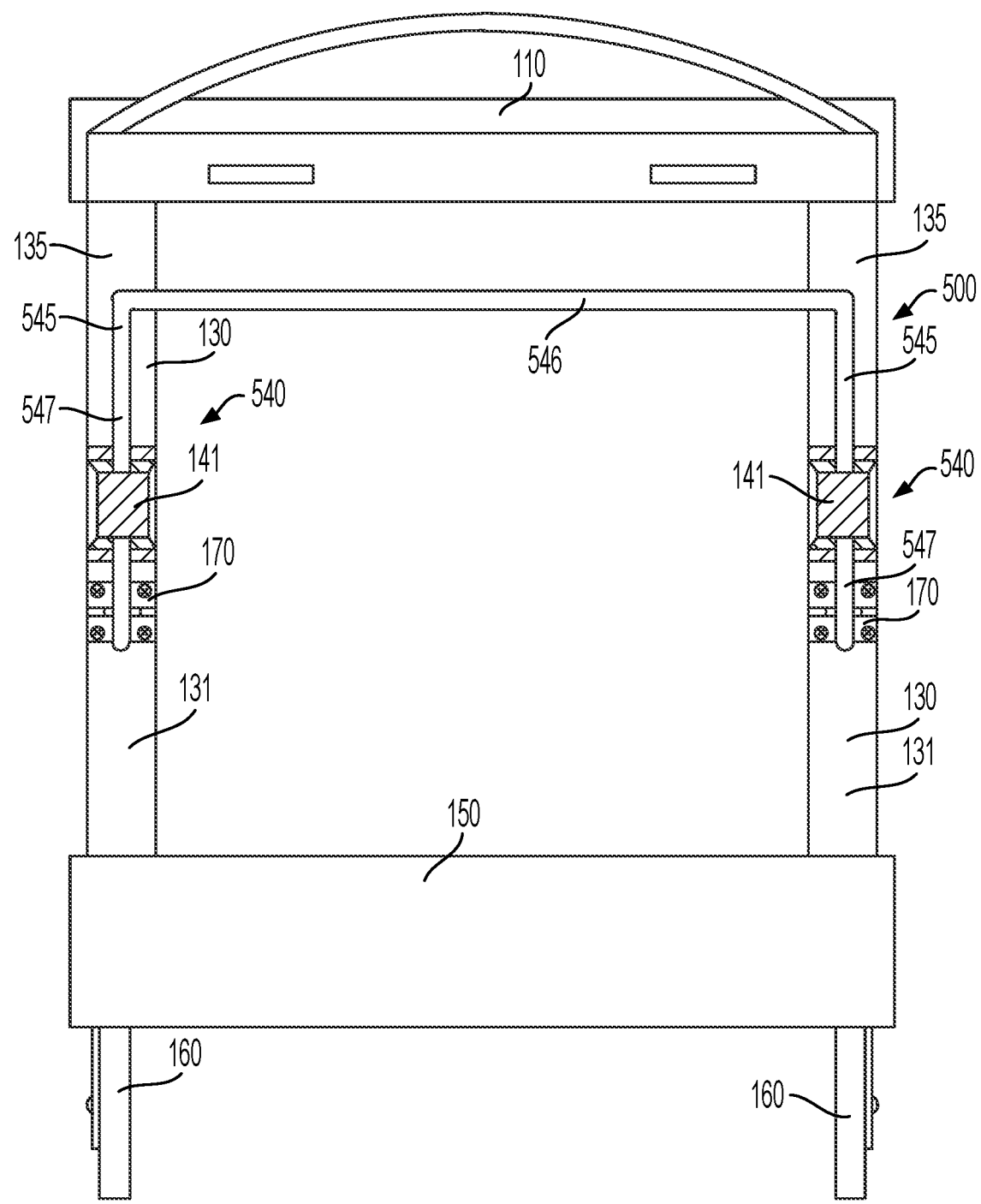
FIG. 31 is a partial front view of the cart of FIG. 28, wherein the collapsible legs are illustrated in the erect configuration.

FIGS. 28-31 depict a collapsible cart 500 comprising many of the same elements as the cart 100 discussed above. Referring primarily to FIG. 31, the cart 500 comprises support mechanisms 540 comprising many of the same elements of the support mechanisms 140. However, instead of a single lock bar for each leg, a lock bar is provided for a pair legs. The support mechanisms 540 comprises a dual lock bar 545 comprising support portions 547 and a cross member lever 546 from which the support portions 547 extend. The cross member lever 546 extends between each leg 130. In at least one instance, each lock bar 545 comprises a U-shape. Any suitable shape may be used. For example, the cross member may be arched to provide extra space between the upper tray 110 and the lower tray 150. The cross member lever 546 extends laterally out of the elongate slots 138 defined in the upper members 135 and the support portions 547 extend through the upper members 135 and into the lower members 131 when the legs 130 are in their erect configuration.

To unlock the legs 130 and allow the legs 130 to be folded, the cross member lever 546 can be pulled in an upward direction to remove, or disengage, the support portions 547 from the apertures 133. When the cross member lever 546 of the lock bar 545 is pulled in the upward direction, the pins 149 compress the springs 148 (FIG. 4) against the upper ledges 142 and the cart may be folded into its folded, or collapsed, configuration.

In at least one instance, the lock bars disclosed herein extend downward toward the lower tray of a cart. Such a lock bar can be stepped on by a person to release corresponding support portions from the erect legs to allow the legs to fold. In such an instance, the lock bars are spring loaded in an upwardly engaging manner to hold the legs in their erect configuration. Thus, downward force is required to allow the cart to fold into its folded configuration. In such an instance, the lock bars may comprise a foot pedal to provide a target step area for the user when the user desires the cart to be in its folded configuration.

Figure 32:
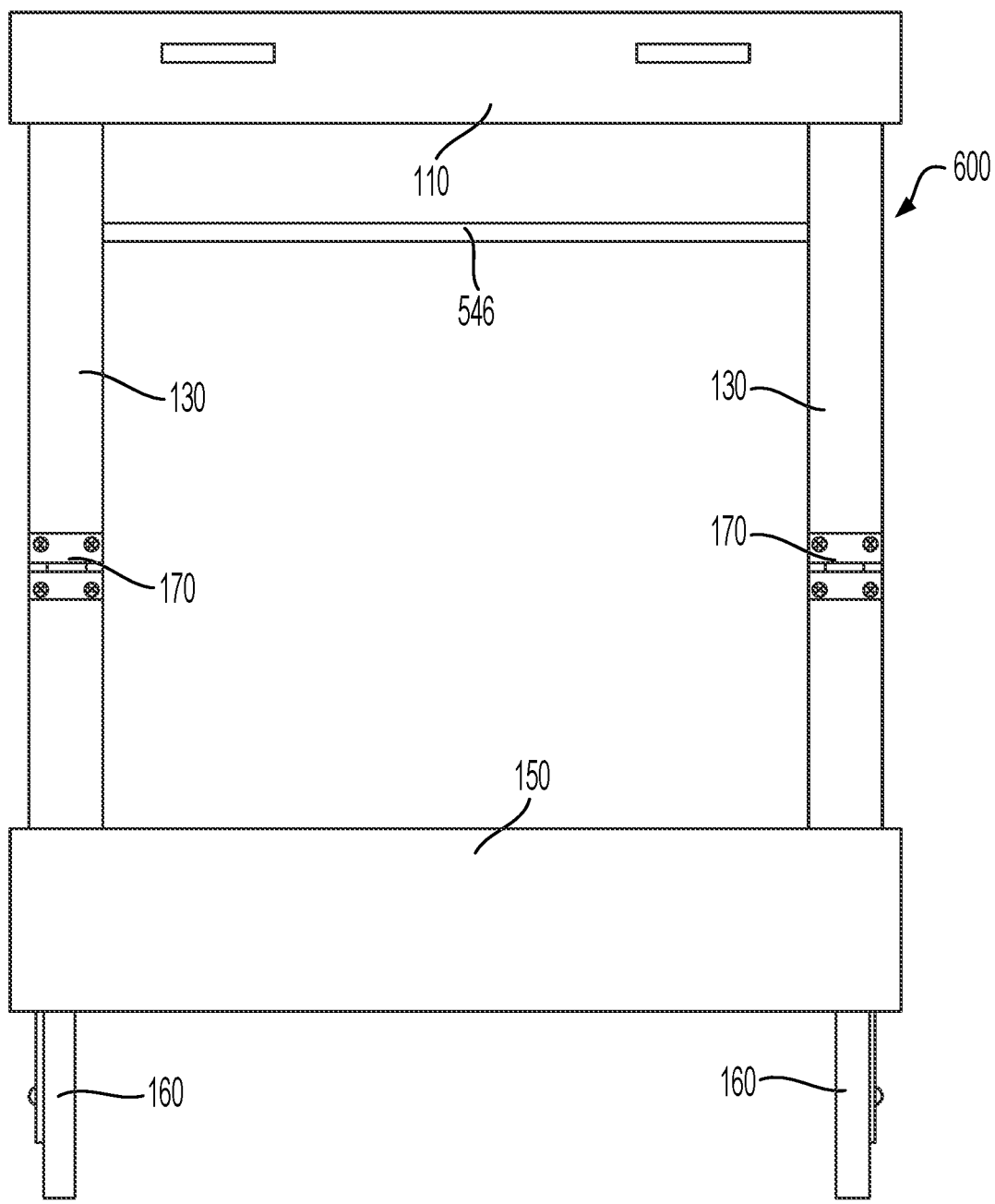
FIG. 32 is a front view of a cart without a handle assembly.

FIG. 32 depict a collapsible cart 600 comprising many of the same elements as the cart 500 discussed above. However, the cart 600 does not comprise a handle assembly. In at least one instance, the handle assembly can be modular and, thus, the cart 600 can be used with and without the entire handle assembly. Hooks may be used to attach and detach a handle assembly to the handle slots 112 on the short side of the cart 600. This may allow for quick connect and disconnect of the entire handle assembly as well as any other desired modular components.

Components of the utility cart may be constructed of a one or more materials. For example, various portions of the utility cart may comprise of a metal, wood, and/or a plastic, for example. Plastic body components may be formed using an injection molding process, for example. Metal body components may be constructed using any suitable metal working process such as, for example, stamping. The legs may be made of plastic and/or steel angle. The body components may be assembled using any suitable fastener and quantity thereof such as, weld, screws, adhesive, and/or rivets, for example. The wheels may be any suitable type of wheel. For example, the wheels may comprise of plastic and/or may be a traditional rubber tire. The wheels may comprise casters and can be free to swivel in any direction as the cart is moved from place to place.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A utility cart, comprising:
a handle;
an upper tray;
a lower tray; and
a plurality of collapsible legs attached to the upper tray and the lower tray, wherein each collapsible leg comprises:
   an upper member pivotably connected to the upper tray;
   a lower member pivotably connected to the lower tray, wherein the upper member and the lower member are pivotably connected to each other such that the upper lower and the lower member can be folded relative to each other to collapse the leg; and
   a spring-loaded support mechanism configured to hold the upper member and the lower member in an erect configuration, wherein the support mechanism comprises:
      a lock bar extending through the upper member and the lower member to hold the upper member and the lower member in an erect configuration, wherein the lock bar comprises:
         a lever portion extending laterally out of the upper member;
         a support portion extending from the lever portion and into the lower member; and
         a pin;
      an internal support bracket attached to the upper member, wherein the support portion of the lock bar is received through a first side of the internal support bracket and a second side of the internal support bracket, and wherein the pin is positioned between the first side and the second side of the internal support bracket; and
      a spring, wherein an entirety of the spring surrounds the lock bar between the first side and the second side of the internal support bracket, wherein the pin is configured to compress the spring against the internal support bracket to move the lock bar into an actuated configuration to move the support portion out of locking engagement with the lower member so that the upper member and the lower member can be collapsed, and wherein the spring is confined entirely within the internal support bracket.

2. The utility cart of claim 1, wherein the handle comprises a removable portion.

3. The utility cart of claim 1, wherein each lever portion extends inwardly toward one of the collapsible legs.

4. The utility cart of claim 1, wherein the collapsible legs are movable between the erect configuration and a fully collapsed configuration, and wherein the upper tray abuts the lower tray when the collapsible legs are in the fully collapsed configuration.

5. The utility cart of claim 1, wherein each collapsible leg comprises a hinge connecting the lower member and the upper member.

6. The utility cart of claim 1, wherein the upper member comprises a bottom plate comprising a first aperture defined therein and the lower member comprises an upper plate comprising a second aperture defined therein, and wherein the support portion extends through the first aperture and the second aperture when the collapsible leg is in the erect configuration.

7. The utility cart of claim 6, wherein the support portion is press fit into the second aperture when the collapsible leg is in the erect configuration.

8. The utility cart of claim 6, wherein the upper plate and the lower plate comprise a secondary holding means.

9. The utility cart of claim 8, wherein the secondary holding means comprises a hook-and-loop fastener.

10. The utility cart of claim 1, wherein the support portion comprises a rounded end configured to engage the lower member when the collapsible leg is in the erect configuration.

11. The utility cart of claim 1, wherein the internal support bracket comprises a u-shape profile.

12. The utility cart of claim 1, wherein the spring comprises a coil spring.

13. The utility cart of claim 12, wherein the coil spring comprises a compression spring.

14. A collapsible cart, comprising:
an upper frame;
a lower frame; and
a plurality of collapsible legs attached to and supporting the upper frame and the lower frame, wherein each collapsible leg comprises:
an upper member pivotably connected to the upper frame;
a lower member pivotably connected to the lower frame, wherein the upper member and the lower member are pivotably connected to each other such that the upper lower and the lower member can be folded relative to each other to collapse the leg; and
a support mechanism configured to hold the upper member and the lower member in an erect configuration, wherein the support mechanism comprises:
a locking pole extending through the upper member and the lower member to hold the upper member and the lower member in an erect configuration, wherein the locking pole comprises:
a lever portion extending laterally out of the upper member;
a locking portion extending from the lever portion and into the lower member; and
a pin;
an internal support brace attached to the upper member, wherein the support portion of the locking pole is received through a first side of the internal support brace and a second side of the internal support brace, and wherein the pin is positioned between and bound by the first side and the second side of the internal support brace; and
a spring configured to bias the locking pole into a locking position, wherein the entire length of the spring surrounds the locking portion between the first side and the second side of the internal support brace, wherein the locking pole is movable from the locking position into an unlocking position to compress the spring against the internal support brace with the pin and move the locking portion out of locking engagement with the lower member so that the upper member and the lower member can be collapsed, and wherein the spring is confined entirely within the internal support brace.

15. The collapsible cart of claim 14, wherein each lever portion extends inwardly toward one of the collapsible legs.

16. The collapsible cart of claim 15, wherein the upper member comprises a bottom plate comprising a first aperture defined therein and the lower member comprises an upper plate comprising a second aperture defined therein, and wherein the locking portion extends through the first aperture and the second aperture when the upper member and the lower member are in the erect configuration.

17. The collapsible cart of claim 16, wherein the locking portion is press fit into the second aperture when the upper member and the lower member are in the erect configuration.

18. The collapsible cart of claim 16, wherein the upper plate and the lower plate comprise a secondary holding means.

19. The collapsible cart of claim 14, wherein the internal support brace comprises a u-shape profile.

20. The collapsible cart of claim 14, wherein said lever portion comprises a cross member connected to another locking portion positioned in another one of said plurality of collapsible legs.

21. A foldable cart, comprising:
an upper frame;
a lower frame; and
a plurality of legs attached to and supporting the upper frame and the lower frame, wherein each leg is configured to be folded into a folded configuration from an erect configuration, and wherein each leg comprises:
a first member pivotably attached to the upper frame;
a second member pivotably attached to the lower frame; and
a lock configured to hold the leg in the erect configuration, wherein the lock comprises:
a lock bar extending through the first member and the second member, wherein the lock bar is movable between a locking position and an unlocking position;
an internal support brace attached to the first member, wherein the lock bar extends through the internal support brace; and
a spring configured to bias the lock bar into the locking position to hold the leg in the erect configuration, wherein the lock bar is spring-loaded against the internal support brace, wherein the entire length of the spring surrounds the lock bar between a first side of the internal support brace and a second side of the internal support brace, wherein the lock bar is movable into the unlocking position to compress the spring against the internal support brace and move the lock bar out of locking engagement with the second member so that the leg can be folded, and wherein the spring is confined entirely within the internal support brace.

* * * * *